US011390270B2

(12) United States Patent
Fukumoto et al.

(10) Patent No.: US 11,390,270 B2
(45) Date of Patent: Jul. 19, 2022

(54) PARKING ASSISTANCE APPARATUS

(71) Applicant: PANASONIC INTELLECTUAL PROPERTY MANAGEMENT CO., LTD., Osaka (JP)

(72) Inventors: Satoshi Fukumoto, Tokyo (JP); Takanobu Ito, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 379 days.

(21) Appl. No.: 16/531,457

(22) Filed: Aug. 5, 2019

(65) Prior Publication Data

US 2020/0039507 A1 Feb. 6, 2020

(30) Foreign Application Priority Data

Aug. 6, 2018 (JP) .............................. JP2018-147488

(51) Int. Cl.
*B60W 30/06* (2006.01)

(52) U.S. Cl.
CPC ......... *B60W 30/06* (2013.01); *B60W 2420/42* (2013.01); *B60W 2420/52* (2013.01); *B60W 2554/00* (2020.02)

(58) Field of Classification Search
CPC .................................................... B60W 30/06
USPC .......................................................... 701/26
See application file for complete search history.

(56) References Cited

U.S. PATENT DOCUMENTS

| 2015/0039213 | A1* | 2/2015 | Stefan | B62D 15/0285 |
| | | | | 701/117 |
| 2017/0088052 | A1* | 3/2017 | Nallapa | G01S 17/04 |
| 2017/0253237 | A1* | 9/2017 | Diessner | B60W 30/06 |
| 2019/0232952 | A1* | 8/2019 | Kim | B62D 15/0285 |
| 2020/0001863 | A1* | 1/2020 | Li | B60W 60/001 |
| 2020/0406889 | A1* | 12/2020 | Yamanaka | G05D 1/0011 |

FOREIGN PATENT DOCUMENTS

| JP | 2017-167925 | 9/2017 |
| JP | 2017-213943 | 12/2017 |
| JP | 2018-97536 | 6/2018 |

OTHER PUBLICATIONS

Japan Office Action issued in Japan Patent Application No. 2018-147488, dated Mar. 13, 2022, together with an English translation thereof.

* cited by examiner

*Primary Examiner* — Peter D Nolan
*Assistant Examiner* — Luke Huynh
(74) *Attorney, Agent, or Firm* — Greenblum & Bernstein, P.L.C.

(57) ABSTRACT

To provide a parking assistance apparatus capable of achieving easier leaving parking space. A parking assistance apparatus includes a detection section detecting a first parking space in which a vehicle can be parked, and a control section forward parking the vehicle in the first parking space. When a second parking space in which the vehicle can be parked in front of the vehicle entering the first parking space, the control section causes the vehicle that has been already under control to be forward parked in the first parking space to enter the second parking space from the first parking space and to be parked in the second parking space.

20 Claims, 6 Drawing Sheets

PARKING ASSISTANCE APPARATUS

TECHNICAL FIELD

The present disclosure relates to a parking assistance apparatus.

BACKGROUND ART

In the past, a parking assistance apparatus has been known which detects a parking space and controls a vehicle to park for forward parking (also referred to as parking in a forward direction) in the parking space (for example, see PTL 1). The forward parking is to move a vehicle forward to enter a parking space to park.

CITATION LIST

Patent Literature

PTL 1
Japanese Patent Application Laid-Open No. 2017-213943

SUMMARY

In this specification, an action of a vehicle parked in a predetermined parking space going out from the parking space is referred to as "leaving parking space".

An object of an aspect of the present disclosure is to provide a parking assistance apparatus capable of achieving easier leaving parking space.

A parking assistance apparatus according to one aspect of the present disclosure includes: a detection section that detects a first parking space in which parking of a vehicle is allowed; and a control section that causes the vehicle to be forward parked in the first parking space, in which, when a second parking space in which parking of the vehicle is allowed is present in front of the vehicle entering the first parking space, the control section causes the vehicle that has been already under control to be forward parked in the first parking space to enter the second parking space from the first parking space and to be parked in the second parking space.

A parking assistance apparatus according to one aspect of the present disclosure includes: a detection section that detects a parking space in which parking of a vehicle is allowed; and a control section that causes the vehicle to enter the parking space through forward movement, in which, when a parking space in which parking of the vehicle is allowed is present in front of the vehicle, the control section controls the vehicle such that the vehicle passes through the parking space.

DESCRIPTION OF EMBODIMENTS

Hereinafter, an embodiment of the present disclosure is described with reference to the accompanying drawings. Note that elements common to the figures are designated by the same reference sign and the descriptions thereof are omitted.

<Configuration of Vehicle>

Figure 1:
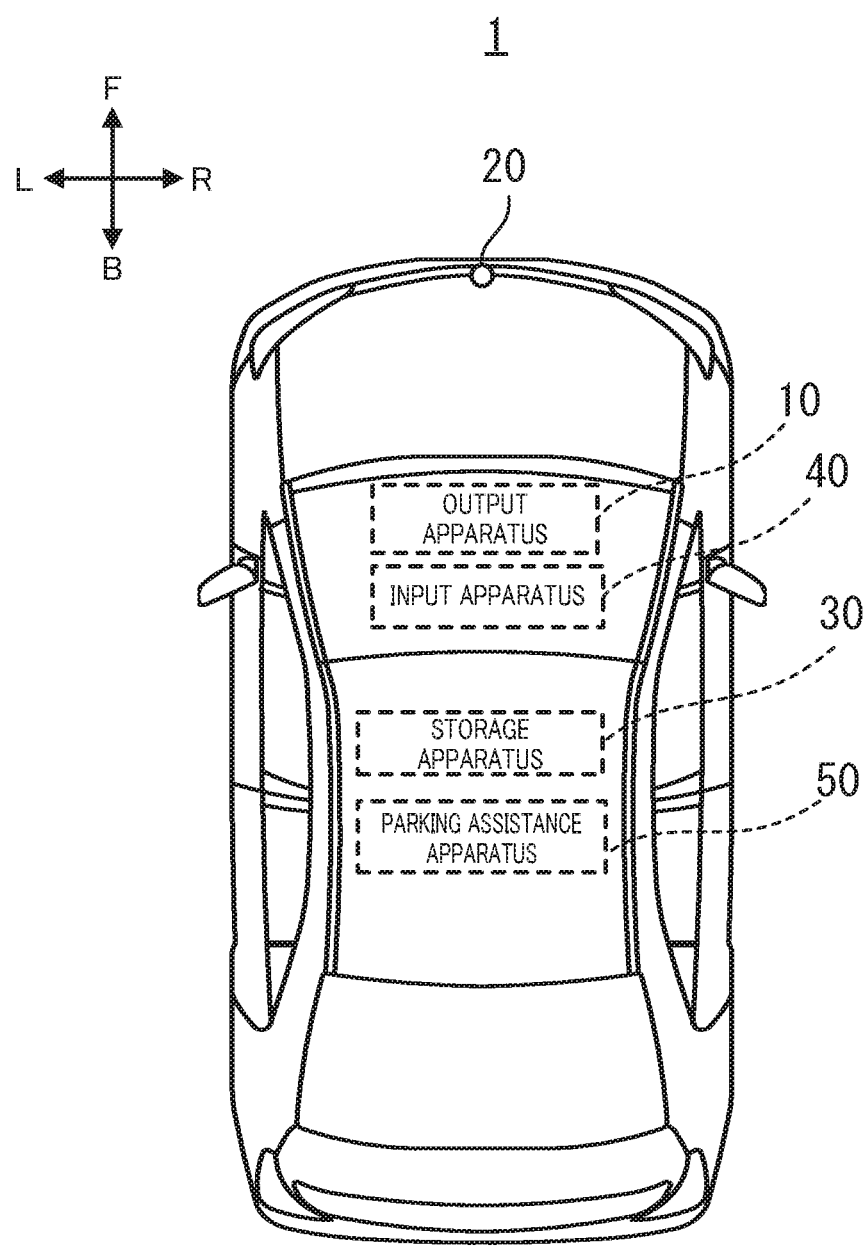
FIG. 1 is a schematic diagram illustrating a configuration example of a vehicle according to an embodiment of the present disclosure.

First, a configuration of vehicle 1 is according to an embodiment of the present disclosure is described using FIG. 1.

FIG. 1 is a schematic diagram illustrating a configuration example of vehicle 1 according to the embodiment. FIG. 1 illustrates a state of vehicle 1 viewed from directly above. In FIG. 1, arrow F indicates a front direction of vehicle 1, arrow B indicates a backward direction of vehicle 1, arrow L indicates a left direction of vehicle 1, and arrow R indicates a right direction of vehicle 1.

As illustrated in FIG. 1, vehicle 1 includes output apparatus 10, imaging apparatus 20, storage 30, input apparatus 40, and parking assistance apparatus 50.

Output apparatus 10 is a device that notifies an occupant in vehicle 1 of various notifications. Output apparatus 10 may be a display apparatus such as a display and a touch panel, an audio output apparatus such as a speaker, or both of them, for example.

Imaging apparatus 20 is a camera device that images the front direction of vehicle 1 (which may include a diagonally right direction and a diagonally left direction), for example. Imaging apparatus 20 is equivalent to a "sensing section" that senses surrounding conditions of vehicle 1. Note that a mounting position of imaging apparatus 20 is not limited to that illustrated in FIG. 1.

Storage 30 is a storage device that stores various pieces of information. Storage 30 may be a hard disk or a memory, for example.

Storage 30 stores predefined feature point information, for example. The feature point information is information indicating feature points of a car stopper placed in the parking space. Storage 30 stores a plurality of pieces of feature point information for each of kinds of the car stopper.

Input apparatus 40 is an input device that accepts various operations by the occupant in vehicle 1. Input apparatus 40 may be a touch panel, or a physical button, switch, and the like, for example. A function of input apparatus 40 may be configured to be included in output apparatus 10.

Parking assistance apparatus 50 is a control device that detects a parking space and automatically parks vehicle 1 in the parking space.

Parking assistance apparatus 50 is electrically connected with output apparatus 10, imaging apparatus 20, storage 30, and input apparatus 40.

Figure 2:
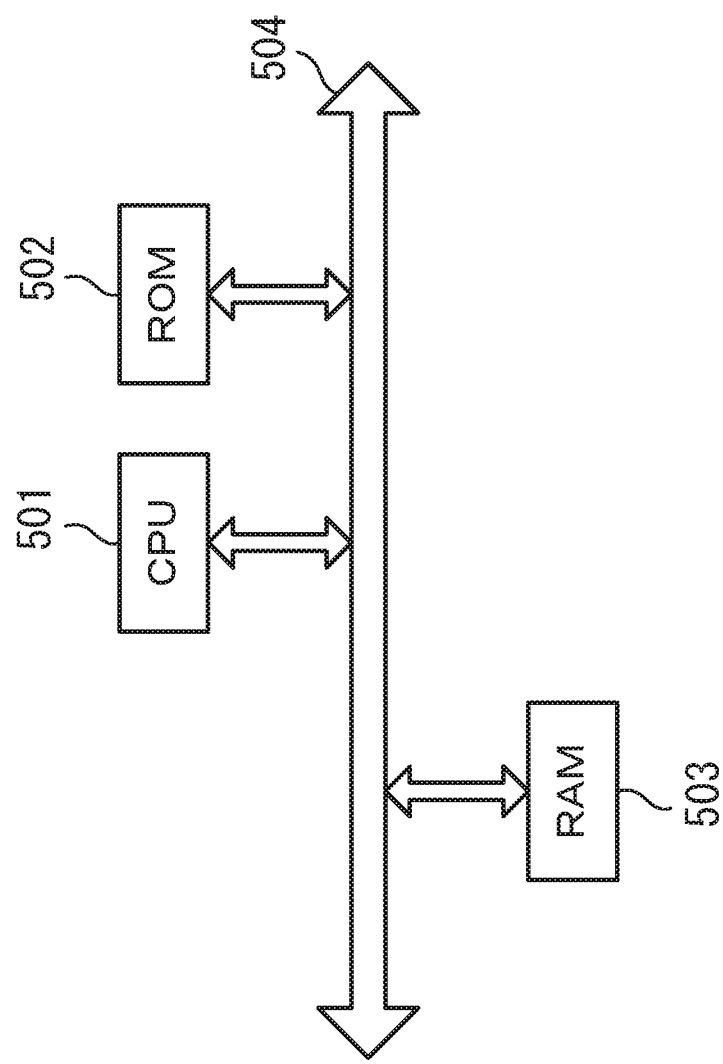
FIG. 2 illustrates an example of a hardware configuration of a computer included in a parking assistance apparatus according to the embodiment of the present disclosure.

Parking assistance apparatus 50 has CPU (Central Processing Unit) 501, ROM (Read Only Memory) 502 storing a computer program therein, and RAM (Random Access Memory) 503 as hardware, as illustrated in FIG. 2, for example. CPU 501, ROM 502, and RAM 503 are connected with each other through bus 504.

Functions of sections in parking assistance apparatus 50 described later (see FIG. 3) are realized by CPU 501 reading from ROM 502 and executing the computer program. This computer program may be recorded in a predetermined recording medium and provided to a user or like.

<Configuration of Parking Assistance Apparatus>

Figure 3:
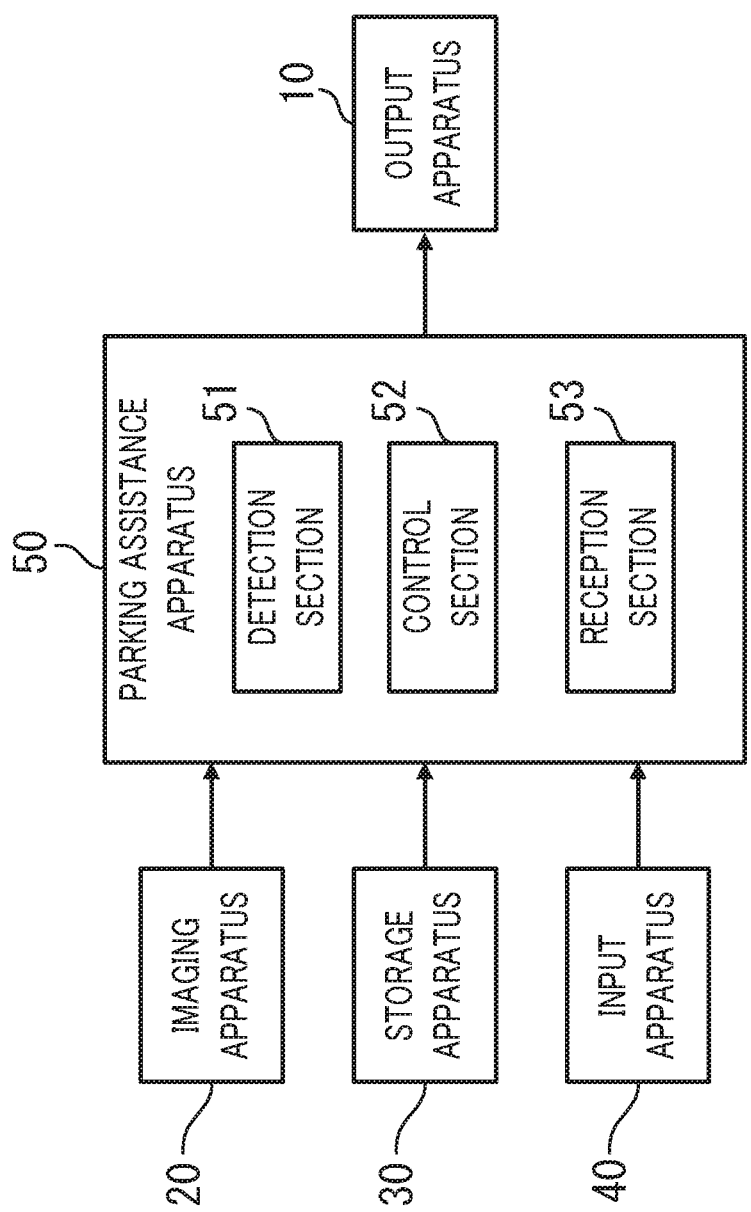
FIG. 3 is a block diagram illustrating a configuration example of the parking assistance apparatus according to the embodiment of the present disclosure.

Next, a configuration of parking assistance apparatus 50 illustrated in FIG. 1 is described using FIG. 3. FIG. 3 is block diagram illustrating a configuration example of parking assistance apparatus 50.

As illustrated in FIG. 3, parking assistance apparatus 50 includes detection section 51, control section 52, and reception section 53.

First, detection section 51 is described.

Detection section 51 receives an image captured by imaging apparatus 20 from imaging apparatus 20, and detects a first parking space in which vehicle 1 can be parked based on the image.

Detection section 51 determines, when control section 52 starts control of forward parking vehicle 1 in the first parking space (hereinafter, referred to as a first parking control), whether or not a second parking space in which vehicle 1 can be parked is present in front of vehicle 1 entering the first parking space.

Figure 4:
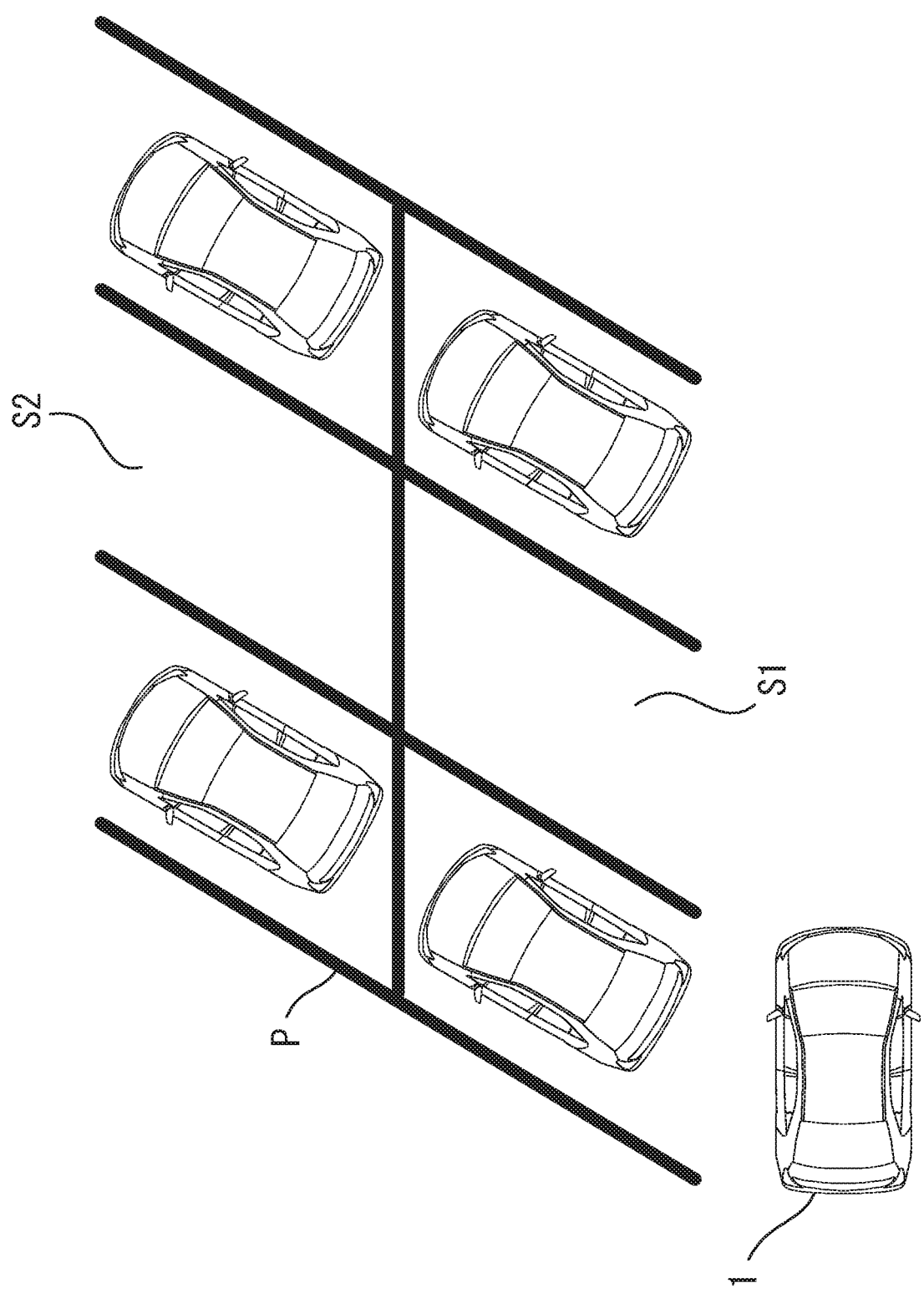
FIG. 4 illustrates an example of a parking space according to the embodiment of the present disclosure.

The embodiment describes, as an example, a case that the parking space detected by detection section 51 is an area which is one of stalls divided by dividing lines drawn on the ground and one vehicle 1 can be parked in. Here, an example of the parking space is described using FIG. 4. FIG. 4 illustrates the parking space viewed from directly above.

FIG. 4 illustrates parallelogram parking spaces diagonally divided by dividing lines P. Such parallelogram parking spaces are provided in a parking area (also referred to as a service area) on an expressway, for example.

Among six parking spaces illustrated in FIG. 4, parked in the parking spaces other than parking spaces S1 and S2 are other vehicles (than vehicle 1), and other vehicles are not parked in the parking spaces S1 and S2. Parking space S1 is an example of the first parking space and parking space S2 is an example of the second parking space.

Hereinabove, one example of the parking space is described. Hereinafter, return to the description of detection section 51.

When detection section 51 determines that the second parking space is present, detection section 51 determines whether or not a car stopper is present in the first parking space.

Specifically, detection section 51 extracts a feature point from the image received from imaging apparatus 20 and checks the feature point against the feature point information read from storage 30 to determine whether or not a car stopper is present in the first parking space.

Note that here is described, as an example, the case of determining whether or not a car stopper is present in the first parking space, but detection section 51 may determine whether or not a car stopper is present in at least one of the first parking space and the second parking space.

Next, control section 52 is described.

Control section 52 controls vehicle 1 such that vehicle 1 is automatically parked in the parking space detected by detection section 51.

Specifically, control section 52 causes various actuators not illustrated in the figure to perform acceleration, deceleration, braking, steering, and the like of vehicle 1 to control a parking operation of vehicle 1. Examples of the actuator includes a motor actuator performing acceleration and deceleration, a brake actuator performing braking, and a steering actuator performing steering.

The parking control by the control section 52 includes a first parking control and a second parking control.

The first parking control is the control of forward parking vehicle 1 in the first parking space, as described above.

The second parking control is control of causing vehicle 1 to enter the second parking space from the first parking space and to be parked in the second parking space. The second parking control is performed when reception section 53 receives parking instruction information described later, for example.

The control section 52 also controls output apparatus 10, when detection section 51 determines that the second parking space is present, to make an inquiry to the occupant in vehicle 1 about whether to park vehicle 1 in the second parking space.

Next, reception section 53 is described.

Reception section 53 receives the parking instruction information from input apparatus 40. The parking instruction information is information for instructing parking in the second parking space.

For example, with respect to the inquiry about whether to park vehicle 1 in the second parking space described above, if the occupant in vehicle 1 performs an operation to instruct the parking in the second parking space, input apparatus 40 transmits the parking instruction information to reception section 53.

<Operation of Parking Assistance Apparatus>

Figure 5:
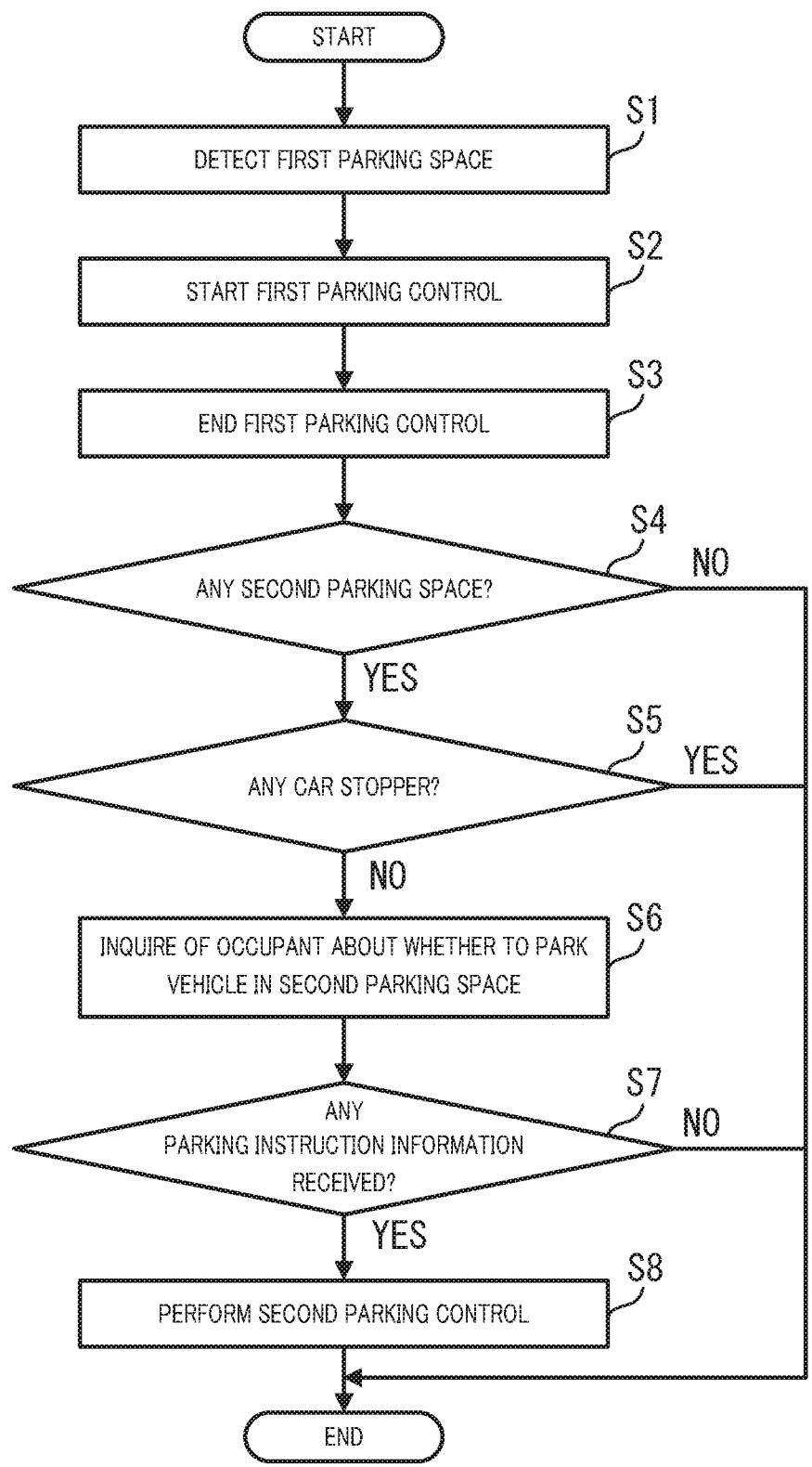
FIG. 5 is a flowchart illustrating an operation example of the parking assistance apparatus according to the embodiment of the present disclosure.

Next, an operation of parking assistance apparatus 50 is described using FIG. 4 and FIG. 5. FIG. 5 is a flowchart illustrating an operation example of parking assistance apparatus 50. The flow illustrated in FIG. 5 is started when the occupant in vehicle 1 operates input apparatus 40 to instruct performing automatically parking, for example.

First, detection section 51 detects the first parking space in which vehicle 1 can be parked (step S1).

For example, detection section 51 detects parking space S1.

Next, control section 52 starts the first parking control (step S2).

For example, control section 52 starts control of forward parking vehicle 1 in parking space S1. This allows vehicle 1 to start entering parking space S1.

Next, control section 52 ends the first parking control (step S3).

For example, control section 52 stops vehicle 1 within parking space S1. This completes the forward parking of vehicle 1.

Next, detection section 51 determines whether or not the second parking space in which vehicle can be parked is present (step S4).

For example, detection section 51 determines whether or not the second parking space in which vehicle 1 can be parked (for example, in which other vehicles are not parked) is present in front of vehicle 1 forward parked in parking space S1.

When the second parking space is not present (step S4: NO), the flow ends. In this case, vehicle 1 remains being forward parked in the first parking space (for example, in parking space S1).

On the other hand, when the second parking space is present (step S4: YES), the flow goes to step S5. In the example in FIG. 4, since other vehicle is not parked in parking space S2, detection section 51 determines that the second parking space is present.

Next, detection section 51 determines whether or not a car stopper is present in the first parking space (step S5). As described above, detection section 51 extracts a feature point from the image received from imaging apparatus 20 and checks the feature point against the feature point information read from storage 30 to determine whether or not a car stopper is present in the first parking space. Imaging apparatus 20 may capture an image at any timing from step S1 to step S4.

When a car stopper is present (step S5: YES), the flow ends In this case, vehicle 1 remains being forward parked in the first parking space (for example, in parking space S1).

On the other hand, when a car stopper is not present (step S5: NO), the flow goes to step S6. In the example in FIG. 4, since no car stopper is provided in the respective parking spaces, detection section 51 determines that a car stopper is not present in parking space S1.

Next, control section 52 controls output apparatus 10 to make an inquiry to the occupant in vehicle 1 about whether to park vehicle 1 in the second parking space (step S6).

This control allows output apparatus 10 to perform display or audio output of a message indicating the inquiry about whether to park vehicle 1 in the second parking space.

Here, the occupant in vehicle 1 operates input apparatus 40 to instruct whether to park vehicle 1 in the second parking space. When input apparatus 40 accepts an operation to instruct parking in the second parking space, input apparatus 40 transmits the parking instruction information. On the other hand, when input apparatus 40 accepts an operation to instruct not parking in the second parking space, input apparatus 40 does not transmit the parking instruction information.

Next, control section 52 determines whether or not reception section 53 receives the parking instruction information within a predefined time (step S7).

When the parking instruction information is not received (step S7: NO), the flow ends. In this case, vehicle 1 remains being forward parked in the first parking space (for example, in parking space S1).

On the other hand, when the parking instruction information is received (step S7: YES), the flow goes to step S8.

Next, control section 52 performs the second parking control (step S8).

For example, control section 52 causes vehicle 1 to be forward parked in parking space S1 move forward, enter parking space S2, and stop within parking space S2. This allows vehicle 1 to enter parking space S2 from parking space S1 and stop within parking space S2. As a result, vehicle 1 is in state of backward parking (also referred to as parking in a backward direction) within parking space S2.

This allows the occupant in vehicle 1 when leaving parking space to cause vehicle 1 to leave the parking space S2 through forward movement. Therefore, the occupant can achieve easier leaving parking space. The occupant when leaving parking space, in confirming surrounding safety, can achieve safe leaving parking space because it is easier to confirm safety at the front than the backward.

As described above, parking assistance apparatus 50 according to the embodiment causes vehicle 1 to enter the second parking space from the first parking space and be parked in the second parking space, when the second parking space in which vehicle 1 can be parked is present in front of vehicle 1 entering the first parking space through forward movement. This allows vehicle 1 to be in the state of backward parking in the second parking space. Therefore, easier leaving parking space can be achieved.

Note that the present disclosure is not limited to the above embodiment and variously modified within a scope not departing from the gist thereof. Hereinafter, variations of the present disclosure are described.

[Variation 1]

In the embodiment, described as an example is the case that detection section 51 detects the first parking space and the second parking space based on the image captured by imaging apparatus 20, but the present disclosure is not limited thereto.

As an example, detection section 51 may detect the first parking space and the second parking space based on a reflective wave of a radio wave transmitted to surroundings (for example, the front and lateral) of vehicle 1. Specifically, when vehicle 1 is strolling in a parking area, a radar radiates a radio wave, and detection section 51 calculates feature points of a parked vehicle based on a reflective wave reflected and detects a parking space based on the feature points. As the radar, a millimeter-wave radar or a laser radar may be used, for example. The laser radar is also referred to as a LIDAR (Light Detection and Ranging). For example, detection section 51 may detect the first parking space and the second parking space based on a reflective wave of an acoustic wave transmitted to surroundings (for example, the front and lateral) of vehicle 1. An ultrasonic sonar can be used as a transmission and reception apparatus that transmits an acoustic wave and receives a reflective wave.

[Variation 2]

In the embodiment, described as an example is the case that the parking spaces are parallelogram areas as illustrated in FIG. 4, but the present disclosure is not limited thereto. For example, the parking space may be a rectangular area.

[Variation 3]

In the embodiment, described as an example is the case that detection section 51 determines whether or not the second parking space is present after completion of the first parking control (in other words, after vehicle 1 completes parking in the first parking space), but the present disclosure is not limited thereto.

For example, detection section 51 may determine whether or not the second parking space is present before vehicle 1 completes parking in the first parking space (for example, at a time when vehicle 1 enters the first parking space). This allows a smooth parking assistance to be performed when vehicle 1 is made to enter the second parking space from the first parking space.

[Variation 4]

In the embodiment, described as an example is the case that control section 52 performs the second parking control in the case that control section 52 controls output apparatus 10 such that the inquiry about whether to park vehicle 1 in the second parking space is made, and thereafter, reception section 53 receives the parking instruction information, but the present disclosure is not limited thereto.

For example, control section 52 may not control output apparatus 10 such that the above inquiry is made. In this case, control section 52 may perform the second parking control without triggered by receiving the parking instruction information. This allows the parking assistance to be automatically performed and allows the smooth parking assistance to be achieved when vehicle 1 is made to enter the second parking space from the first parking space. Note that, in this case, parking assistance apparatus 50 may not include reception section 53.

[Variation 5]

In the embodiment, described as an example is the case that the parking spaces are areas divided by the dividing lines, but the parking spaces may not be the areas divided by the dividing lines or the like. A detection method of the parking space in this case is described below.

Storage 30 stores in advance a vehicle size information before performing detection of the parking space. Vehicle size information is information indicating values of a vehicle length (length in a front-back direction), a vehicle width (length in a right-left direction), and a vehicle height (length in an up-down direction) of vehicle 1.

First, detection section 51 detects a space in which no obstacle is present based on an image received from imaging apparatus 20. Examples of the obstacle includes other vehicles, building structures, and curbstones. Note that sensed results by the radar described in Variation 1 may be used instead of an image.

Next, detection section 51 calculates values of a depth, a width, and a height of the detected space, and determines whether or not the calculated values are larger than the values indicated in the vehicle size information (vehicle length, vehicle width, and vehicle height).

As a result of the determination, if the calculated values are larger than the values in the vehicle size information, detection section 51 determines the detected space as a parking space.

Note that, for example, in a case that the width of the determined parking space (length in the width direction) is only slightly larger than the vehicle width, if vehicle 1 is parked in the parking space, a door opening and closing are likely to be interfered. Therefore, detection section 51 may add predefined values to the values in the vehicle size information, and if the calculated values are larger than the values after the addition, detection section 51 may determine the detected space as a parking space.

[Variation 6]

When other vehicles are parked diagonally right and diagonally left in front of vehicle 1 entering the first parking space (for example, in the case of the state illustrated in FIG. 4), detection section 51 may calculate a distance between the relevant other vehicles based on sensed results by the ultrasonic sonar described in Variation 1, for example. Then, if the distance between the relevant other vehicles is larger than the vehicle width of vehicle 1 (or the value after the addition described in Variation 5 above), detection section 51 may determine that the second parking space is present.

[Variation 7]

When other vehicle is parked in a parking space adjacent to the second parking space (for example, in the case of the state illustrated in FIG. 4), detection section 51 may determine an open or closed state of the door of the relevant other vehicle based on the image received from imaging apparatus 20. When the door of other vehicle is in an open state, control section 52 may control vehicle 1 such that vehicle 1 does not enter the second parking space. This can prevent vehicle 1 from colliding with the door of other vehicle.

Note that information received from other vehicle may be used instead of the image captured by imaging apparatus 20. For example, when reception section 53 receives information indicating an open or closed state of the door from other vehicle transmitted wirelessly from other vehicle, detection section 51 may determine the open or closed state of the door of other vehicle base on the information.

[Variation 8]

When other vehicle is parked in a parking space adjacent to the second parking space (for example, in the case of the state illustrated in FIG. 4), detection section 51 may determine whether or not an occupant is in the relevant other vehicle based on the image received from imaging apparatus 20. When an occupant is in other vehicle, control section 52 may control vehicle 1 such that vehicle 1 does not enter the second parking space. This can prevent vehicle 1 from colliding with an occupant coming out of other vehicle.

Note that information received from other vehicle may be used instead of the image captured by imaging apparatus 20. For example, when reception section 53 receives information indicating a presence or absence of an occupant transmitted wirelessly from other vehicle, detection section 51 may determine whether or not an occupant is in the relevant other vehicle base on the information.

[Variation 9]

When detection section 51 recognizes that parking spaces are diagonally divided (or that each parking space is parallelogram), detection section 51 may start the detection process (step S1 in FIG. 5) of the first parking space based on the image received from imaging apparatus 20. Note that the method for recognizing that the parking spaces are diagonally divided may use a known technology (for example, the technology disclosed in Japanese Patent Application Laid-Open No. 2016-16681).

[Variation 10]

In the embodiment, described as an example is the case that the determination process of a presence or absence of the second parking space is performed after the detection process of the first parking space, but the present disclosure is not limited thereto.

For example, the detection process of the first parking space and the detection process of the second parking space may be simultaneously performed. In this case, detection section 51 may perform the detection processes described above based on information indicating a free area in the parking spaces received from a server apparatus not illustrated in the figure.

[Variation 11]

In the embodiment, described as an example is the case that vehicle 1 is parked in any of the first parking space or the second parking space, but the present disclosure is not limited thereto.

For example, parking assistance apparatus 50 may perform control such that when the second parking space though which vehicle 1 can pass is detected when vehicle 1 forward parked in the first parking space leaves the parking space, vehicle 1 passes through the second parking space. This operation example is described below using FIG. 6.

Figure 6:
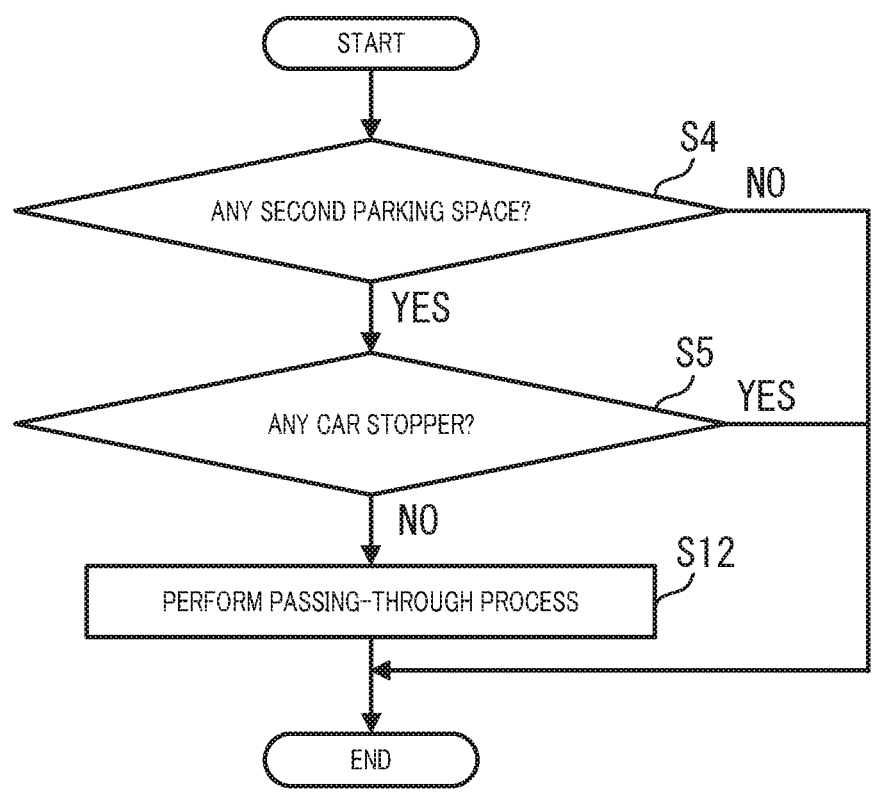
FIG. 6 is a flowchart illustrating an operation example of a parking assistance apparatus according to Variation 11 the present disclosure.

FIG. 6 is a flowchart illustrating an operation example of parking assistance apparatus 50 in this Variation. In FIG. 6, the same step as in FIG. 5 is designated the same reference sign. The flow in FIG. 6 starts when vehicle 1 forward parked in the first parking space (for example, parking space S1 illustrated in FIG. 4) leaves the parking space.

First, detection section 51 determines whether or not the second parking space is present (step S4). The second parking space is parking space S2 illustrated in FIG. 4, for example.

When the second parking space is not present (step S4: NO), the flow ends.

On the other hand, when the second parking space is present (step S4: YES), detection section 51 determines whether or not a car stopper is present in the first parking space (step S5).

For example, detection section 51 extracts a feature point from the image received from imaging apparatus 20 and checks the feature point against the feature point information read from storage 30 to determine whether or not a car stopper is present in the first parking space. As an example, the image captured by imaging apparatus 20 may be captured before vehicle 1 completes parking in the first parking space. The captured image is recorded in a predetermined storage, and detection section 51 may adequately read the image to check the read image against the feature point information read from storage 30.

When a car stopper is present (step S5: YES), the flow ends

On the other hand, when a car stopper is not present (step S5: NO), control section 52 perform a passing-through process (step S12).

Note that the detection of the car stopper in step S5 may be performed before vehicle 1 completes parking in the first parking space. In this case, when a car stopper is not present, the process in step S4 may be followed by the process in step S12.

The passing-through process is control of causing vehicle 1 parked in the first parking space to enter the second parking space and to pass through the second parking space. Performing this control allows vehicle 1 to enter the second parking space from the first parking space, pass through the second parking space, and leave the second parking space.

As described above, parking assistance apparatus 50 according to the embodiment causes vehicle 1 to enter the second parking space from the first parking space and to pass through the second parking space, when the second parking space in which vehicle 1 can be parked is present in front of vehicle 1 that has completed being parked in the first parking space through forward movement. This allows the occupant in vehicle 1 when leaving parking space to cause vehicle 1 to leave the parking space through forward movement. Therefore, the occupant can achieve easier leaving parking space. The occupant when leaving parking space, in confirming surrounding safety, can achieve safe leaving parking space because it is easier to confirm safety at the front than the backward.

Note that in this Variation, the parking assistance apparatus may be rephrased as a "vehicle travel control apparatus".

[Variation 12]

The blocks described in the above embodiment such as detection section 51, control section 52, and reception section 53 may be individually made into one chip by a semiconductor apparatus such as a LSI, or may be made into one chip configured to include a part or all thereof.

A part or all of the functional blocks described in the above embodiment may be implemented by a computer program. The processes described in the above embodiment may be implemented by hardware, or software (including a case implemented with an OS (operating system), middleware, or a predetermined library). Furthermore, a mixed process of software and hardware may implement the processes described in the above embodiment.

An order of performing the processes according to the above embodiment is not necessarily limited to that described in the above embodiment, and the performing order can be changed within a scope not departing from the gist of the present disclosure.

The variations described above may be adequately combined.

<Summarization of Present Disclosure>

The present disclosure is summarized as below.

A parking assistance apparatus of the present disclosure includes: a detection section that detects a first parking space in which parking of a vehicle is allowed; and a control section that causes the vehicle to be forward parked in the first parking space, in which, when a second parking space in which parking of the vehicle is allowed is present in front of the vehicle entering the first parking space, the control section causes the vehicle that has been already under control to be forward parked in the first parking space to enter the second parking space from the first parking space and to be parked in the second parking space.

In the above parking assistance apparatus of the present disclosure, the detection section may determine whether or not the second parking space is present after the vehicle completes parking in the first parking space.

In the above parking assistance apparatus of the present disclosure, the detection section may determine whether or not the second parking space is present before vehicle completes parking in the first parking space.

In the above parking assistance apparatus of the present disclosure, the detection section may determine whether or not a car stopper is present in the first parking space, and when the car stopper is present, the control section may cause the vehicle to be parked in the first parking space.

In the above parking assistance apparatus of the present disclosure, when the second parking space is present, the control section may control a predetermined output apparatus to make an inquiry to an occupant of the vehicle about whether to park the vehicle in the second parking space before making the vehicle enter the second parking space.

The above parking assistance apparatus of the present disclosure may further include: a reception section that receives parking instruction information for instructing parking in the second parking space, in which, when the reception section receives the parking instruction information, the control section may cause the vehicle to enter the second parking space from the first parking space and be parked in the second parking space.

In the above parking assistance apparatus of the present disclosure, the detection section may detect the first parking space and the second parking space based on an image of surroundings of the vehicle captured by an imaging apparatus.

In the above parking assistance apparatus of the present disclosure, the detection section may detect the first parking space and the second parking space based on a reflective wave of an acoustic wave or a radio wave, the acoustic wave or the radio wave being transmitted to surroundings of the vehicle by a transmission and reception apparatus and the reflective wave of the acoustic wave or the radio wave being received by the transmission and reception apparatus.

In the above parking assistance apparatus of the present disclosure, when other vehicles are respectively parked diagonally right and diagonally left in front of the vehicle entering the first parking space, the detection section may calculate a distance between the other vehicles, and when the distance between the other vehicles is larger than a vehicle width of the vehicle, the detection section may determine that the second parking space is present.

In the above parking assistance apparatus of the present disclosure, when another vehicle is parked in a parking space adjacent to the second parking space, the detection section may determine an open or closed state of a door of the other vehicle, and when the door of the other vehicle in the open state, the control section may control the vehicle such that the vehicle does not enter the second parking space.

In the above parking assistance apparatus of the present disclosure, when another vehicle is parked in a parking space adjacent to the second parking space, the detection section may determine whether or not an occupant is in the other vehicle, and when an occupant is in the other vehicle, the control section may control the vehicle such that the vehicle does not enter the second parking space.

In the above parking assistance apparatus of the present disclosure, when the detection section recognizes that parking spaces are diagonally divided, the detection section may start detecting the first parking space.

A parking assistance apparatus of the present disclosure includes: a detection section that detects a parking space in which parking of a vehicle is allowed; and a control section that causes the vehicle to enter the parking space through forward movement, in which, when a parking space in which parking of the vehicle is allowed is present in front of the vehicle, the control section controls the vehicle such that the vehicle passes through the parking space.

While various embodiments have been described herein above, it is to be appreciated that various changes in form and detail may be made without departing from the spirit and scope of the invension(s) presently or hereafter claimed.

This application is entitled to and claims the benefit of Japanese Patent Application No. 2018-147488, filed on Aug. 6, 2018, the disclosure of which including the specification, drawings and abstract is incorporated herein by reference in its entirety.

INDUSTRIAL APPLICABILITY

The parking assistance apparatus according to the present disclosure is advantageous for the technology assisting the parking in the parking space.

REFERENCE SIGNS LIST

1 Vehicle
10 Output apparatus
20 Imaging apparatus
30 Storage
40 Input apparatus
50 Parking assistance apparatus
51 Detection section
52 Control section
53 Reception section
501 CPU
502 ROM
503 RAM
504 Bus
P Dividing line
S1, S2 Parking space

The invention claimed is:

1. A parking control circuit configured to be mounted on a vehicle, comprising:
an input circuit configured to be coupled with an imaging device to capture an ambient image of the vehicle;
an output circuit configured to be coupled with a steering actuator performing steering of the vehicle, wherein
while the vehicle is travelling into a first parking space, the first parking space being detected based on the ambient image of the vehicle captured by the imaging device, when the parking control circuit detects a second parking space based on the ambient image of the vehicle captured by the imaging device, the second parking space being adjacent to the first parking space in a travelling direction of the vehicle, the second parking space being farther than the first parking space from the vehicle, the parking control circuit automatically controls at least the steering actuator of the vehicle to cause the vehicle to be automatically parked in the second parking space.

2. The parking control circuit according to claim 1, wherein
after the vehicle parks in the first parking space, the parking control circuit detects the second parking space based on the ambient image of the vehicle captured by the imaging device.

3. The parking control circuit according to claim 1, wherein
before the vehicle parks in the first parking space, the parking control circuit detects the second parking space based on the ambient image of the vehicle captured by the imaging device.

4. The parking control circuit according to claim 1, wherein
while the vehicle is travelling into the first parking space, when the parking control circuit detects no car stopper in the first parking space and the second parking space based on the ambient image of the vehicle captured by the imaging device, the parking control circuit automatically controls at least the steering actuator of the vehicle to cause the vehicle to be parked in the second parking space,
when the parking control circuit detects a car stopper in the first parking space and the second parking space based on the ambient image of the vehicle captured by the imaging device, the parking control circuit does not control at least the steering actuator of the vehicle to cause the vehicle to be parked in the second parking space.

5. The parking control circuit according to claim 1, wherein
the output circuit of the parking control circuit is further configured to be coupled with an output device mounted on the vehicle,
when the parking control circuit detects the second parking space based on the ambient image of the vehicle captured by the imaging device, the parking control circuit makes an inquiry to an occupant of the vehicle about whether to park the vehicle in the second parking space using the output device before the vehicle enters the second parking space.

6. The parking control circuit according to claim 5, wherein
the input circuit of the parking control circuit is further configured to be coupled with an input device mounted on the vehicle, and
after the parking control circuit makes the inquiry to the occupant of the vehicle using the output device, when the parking control circuit receives a parking instruction for parking in the second parking space using the input device, the parking control circuit automatically control the vehicle to enter the second parking space from the first parking space.

7. The parking control circuit according to claim 1, wherein,
the vehicle is defined as a first vehicle, and
while the first vehicle is travelling into the first parking space, when the parking control circuit detects a second vehicle parked diagonally right in front of the first vehicle and a third vehicle parked diagonally left in front of the first vehicle, with a distance between the second vehicle and the third vehicle being greater than a vehicle width of the first vehicle, the parking control circuit determines that the second parking space is present.

8. The parking control circuit according to claim 1, wherein,
the vehicle is defined as a first vehicle, and
while the first vehicle is travelling into the first parking space, when the parking control circuit detects the second parking space, a second vehicle being adjacent to the second parking space, and an opening door of the second vehicle, the parking control circuit does not cause the first vehicle to enter the second parking space.

9. The parking control circuit according to claim 1, wherein,
the vehicle is defined as a first vehicle, and
while the first vehicle is travelling into the first parking space, when the parking control circuit detects the second parking space, a second vehicle being adjacent to the second parking space, and an occupant is in the second vehicle, the parking control circuit does not cause the first vehicle to enter the second parking space.

10. The parking control circuit according to claim 1, wherein,
after the parking control circuit detects parking spaces being diagonally divided, the parking control circuit starts detecting the first parking space.

11. A parking control circuit configured to be mounted on a vehicle, comprising:
an input circuit configured to be coupled with a transmission and reception device mounted on the vehicle, the transmission and reception device transmitting an acoustic wave or a radio wave, and receiving a reflective wave of the acoustic wave or the radio wave;
an output circuit configured to be coupled with a steering actuator performing steering of the vehicle; wherein
while the vehicle is travelling into a first parking space, the first parking space being detected based on the reflective wave received by the transmission and reception device, when the parking control circuit detects a second parking space based on the reflective wave received by the transmission and reception device, the second parking space being adjacent to the first parking space in a travelling direction of the vehicle, the second parking space being farther than the first parking space from the vehicle, the parking control circuit automatically controls at least the steering actuator of the vehicle to cause the vehicle to be automatically parked in the second parking space.

12. The parking control circuit according to claim 11, wherein
after the vehicle parks in the first parking space, the parking control circuit detects the second parking space based on the reflective wave received by the transmission and reception device.

13. The parking control circuit according to claim 11, wherein
before the vehicle parks in the first parking space, the parking control circuit detects the second parking space based on the reflective wave received by the transmission and reception device.

14. The parking control circuit according to claim 11, wherein
while the vehicle is travelling into the first parking space, when the parking control circuit detects no car stopper in the first parking space and the second parking space based on the reflective wave received by the transmission and reception device, the parking control circuit automatically controls at least the steering actuator of the vehicle to cause the vehicle to be parked in the second parking space,
when the parking control circuit detects a car stopper in the first parking space and the second parking space based on the reflective wave received by the transmission and reception device, the parking control circuit does not control at least the steering actuator of the vehicle to cause the vehicle to be parked in the second parking space.

15. The parking control circuit according to claim 11, wherein
the output circuit of the parking control circuit is further configured to be coupled with an output device mounted on the vehicle, and
when the parking control circuit detects the second parking space based on the reflective wave received by the transmission and reception device, the parking control circuit makes an inquiry to an occupant of the vehicle about whether to park the vehicle in the second parking space using the output device before the vehicle enters the second parking space.

16. The parking control circuit according to claim 15, wherein:
the input circuit of the parking control circuit is further configured to be coupled with an input device mounted on the vehicle, and
after the parking control circuit makes the inquiry to the occupant of the vehicle, when the parking control circuit receives a parking instruction for parking in the second parking space using the input device, the parking control circuit automatically control the vehicle to enter the second parking space.

17. The parking control circuit according to claim 11, wherein,
the vehicle is defined as a first vehicle, and
while the first vehicle is travelling into the first parking space, when the parking control circuit detects a second vehicle parked diagonally right in front of the first vehicle and a third vehicle parked diagonally left in front of the first vehicle, with a distance between the second vehicle and the third vehicle being greater than a vehicle width of the first vehicle, the parking control circuit determines that the second parking space is present.

18. The parking control circuit according to claim 11, wherein,
the vehicle is defined as a first vehicle, and
while the first vehicle is travelling into the first parking space, when the parking control circuit detects the second parking space, a second vehicle being adjacent to the second parking space, and an opening door of the second vehicle, the parking control circuit does not cause the vehicle to enter the second parking space.

19. The parking control circuit according to claim 11, wherein,
the vehicle is defined as a first vehicle, and
while the first vehicle is travelling into the first parking space, when the parking control circuit detects the second parking space, a second vehicle being adjacent to the second parking space, and an occupant of the second vehicle, the parking control circuit does not cause the vehicle to enter the second parking space.

20. The parking control circuit according to claim 11 wherein,
after the parking control circuit detects parking spaces being diagonally divided, the parking control circuit starts detecting the first parking space.

* * * * *